US011695512B2

(12) United States Patent
Yerramalli et al.

(10) Patent No.: US 11,695,512 B2
(45) Date of Patent: Jul. 4, 2023

(54) DOWNLINK ASSIGNMENT INDEX (DAI) UPDATES FOR PIGGYBACK DOWNLINK CONTROL INFORMATION (DCI)

(71) Applicant: QUALCOMM Incorporated, San Diego, CA (US)

(72) Inventors: Srinivas Yerramalli, Hyderabad (IN); Jing Sun, San Diego, CA (US); Xiaoxia Zhang, San Diego, CA (US); Tao Luo, San Diego, CA (US); Qiang Wu, San Diego, CA (US); Zhifei Fan, San Diego, CA (US); Arumugam Chendamarai Kannan, San Diego, CA (US); Sungwoo Park, Seoul (KR); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 17/185,543

(22) Filed: Feb. 25, 2021

(65) Prior Publication Data

US 2021/0359790 A1 Nov. 18, 2021

Related U.S. Application Data

(60) Provisional application No. 63/025,752, filed on May 15, 2020.

(51) Int. Cl.
*H04L 1/1607* (2023.01)
*H04L 1/1812* (2023.01)
(Continued)

(52) U.S. Cl.
CPC .......... *H04L 1/1664* (2013.01); *H04L 1/1812* (2013.01); *H04W 72/0446* (2013.01); *H04W 72/23* (2023.01); *H04L 2001/125* (2013.01)

(58) Field of Classification Search
CPC ... H04L 1/1664; H04L 1/1812; H04L 1/1854; H04L 1/1896; H04L 5/0053;
(Continued)

(56) References Cited

U.S. PATENT DOCUMENTS 8,891,416 B2 * 11/2014 Yang ..................... H04L 5/0055
370/280
9,131,491 B2 * 9/2015 Lee ..................... H04W 72/042
(Continued)

FOREIGN PATENT DOCUMENTS

AU 2020222877 A1 * 8/2021 ........... H04L 1/1614
CN 103229447 A * 7/2013 ............ H04J 3/1694
(Continued)

OTHER PUBLICATIONS

International Search Report and Written Opinion—PCT/US2021/019858—ISAEPO—Jun. 21, 2021.

*Primary Examiner* — Eric Nowlin
(74) *Attorney, Agent, or Firm* — Patterson + Sheridan, LLP

(57) ABSTRACT

Certain aspects may be implemented in a method for wireless communication. The method generally includes determining a counter downlink assignment index (cDAI) to be included in each of a plurality of downlink control information (DCI), each of a first subset of the plurality of DCI being on a control channel, and each of a second subset of the plurality of DCI being on a data channel, each of the first subset of the plurality of DCI scheduling one of the data channels, and wherein each of the control channels and the data channels is on a cell of a plurality of cells, the determination of the cDAIs being based on order of the cell, with respect to the plurality of cells, on which each of the cDAIs is to be transmitted; generating and outputting for
(Continued)

transmission the control channels and data channels in accordance with the determination.

28 Claims, 12 Drawing Sheets

(51) Int. Cl.
*H04W 72/0446* (2023.01)
*H04W 72/23* (2023.01)
*H04L 1/12* (2006.01)

(58) Field of Classification Search
CPC ........... H04L 5/0094; H04L 2001/125; H04W 72/042; H04W 72/0446; H04W 72/1289
See application file for complete search history.

(56) References Cited

U.S. PATENT DOCUMENTS

| | | | |
|---|---|---|---|
| 9,226,276 B2* | 12/2015 | Yang | H04L 5/14 |
| 9,510,334 B2* | 11/2016 | Yang | H04L 1/1621 |
| 9,839,014 B2* | 12/2017 | Yang | H04W 72/0413 |
| 9,888,465 B2* | 2/2018 | Papasakellariou | H04W 72/042 |
| 10,469,234 B2* | 11/2019 | Yang | H04W 72/12 |
| 10,523,397 B2* | 12/2019 | Park | H04L 1/1671 |
| 10,574,408 B2* | 2/2020 | Aiba | H04L 5/0055 |
| 10,757,690 B2* | 8/2020 | Sun | H04L 1/0079 |
| 10,797,832 B2* | 10/2020 | Khoshnevisan | H04L 1/1896 |
| 10,813,118 B2* | 10/2020 | Park | H04L 1/0073 |
| 10,848,291 B2* | 11/2020 | Yang | H04W 72/0413 |
| 10,924,225 B2* | 2/2021 | Tsai | H04L 1/1854 |
| 10,931,408 B2* | 2/2021 | Khoshnevisan | H04W 24/08 |
| 11,032,052 B2* | 6/2021 | Park | H04L 5/0055 |
| 11,088,809 B2* | 8/2021 | Yang | H04L 1/1861 |
| 11,121,824 B2* | 9/2021 | Papasakellariou | H04L 5/0048 |
| 11,128,407 B2* | 9/2021 | Papasakellariou | H04L 5/0091 |
| 11,191,068 B2* | 11/2021 | Sun | H04W 72/14 |
| 11,528,692 B2* | 12/2022 | Papasakellariou | H04W 52/281 |
| 2013/0223300 A1* | 8/2013 | Yang | H04L 1/1861 370/280 |
| 2015/0049655 A1* | 2/2015 | Yang | H04L 5/14 370/280 |
| 2016/0088612 A1* | 3/2016 | Yang | H04W 72/0413 370/280 |
| 2016/0295561 A1* | 10/2016 | Papasakellariou | H04L 5/0094 |
| 2016/0338028 A1* | 11/2016 | Park | H04L 1/1861 |
| 2017/0048848 A1* | 2/2017 | Yang | H04L 1/1621 |
| 2018/0006790 A1* | 1/2018 | Park | H04L 1/1887 |
| 2018/0124753 A1* | 5/2018 | Sun | H04W 72/042 |
| 2018/0159665 A1* | 6/2018 | Yang | H04L 1/1861 |
| 2018/0159675 A1* | 6/2018 | Yang | H04L 5/001 |
| 2019/0037586 A1* | 1/2019 | Park | H04L 1/0026 |
| 2019/0132093 A1* | 5/2019 | Aiba | H04W 76/11 |
| 2020/0044791 A1* | 2/2020 | Tsai | H04W 72/0413 |
| 2020/0044812 A1* | 2/2020 | Yang | H04W 72/12 |
| 2020/0112417 A1* | 4/2020 | Park | H04L 1/1861 |
| 2020/0127772 A1* | 4/2020 | Papasakellariou | H04L 1/1822 |
| 2020/0127773 A1* | 4/2020 | Papasakellariou | H04L 1/1861 |
| 2020/0127796 A1* | 4/2020 | Li | H04L 1/1812 |
| 2020/0154414 A1* | 5/2020 | Sun | H04L 1/1864 |
| 2020/0178226 A1* | 6/2020 | Papasakellariou | H04W 52/325 |
| 2020/0266937 A1* | 8/2020 | Khoshnevisan | H04L 1/1819 |
| 2020/0280396 A1* | 9/2020 | Gao | H04L 1/1861 |
| 2020/0396760 A1* | 12/2020 | Yi | H04L 1/1864 |
| 2021/0006363 A1* | 1/2021 | Khoshnevisan | H04L 1/1896 |
| 2021/0250135 A1* | 8/2021 | Khoshnevisan | H04L 5/0055 |
| 2021/0329684 A1* | 10/2021 | Yang | H04W 72/14 |
| 2021/0352704 A1* | 11/2021 | Yang | H04L 5/0053 |
| 2021/0360666 A1* | 11/2021 | Yoshimura | H04W 72/1273 |
| 2022/0104231 A1* | 3/2022 | Gou | H04L 1/189 |
| 2022/0123875 A1* | 4/2022 | Liang | H04L 1/1854 |
| 2022/0321303 A1* | 10/2022 | Matsumura | H04L 5/0053 |
| 2023/0030642 A1* | 2/2023 | Yuan | H04L 1/1854 |
| 2023/0048080 A1* | 2/2023 | Takahashi | H04W 72/1263 |

FOREIGN PATENT DOCUMENTS

| | | | | |
|---|---|---|---|---|
| CN | 103229447 B | * | 1/2016 | ............ H04J 3/1694 |
| CN | 105450369 A | * | 3/2016 | ............ H04J 3/1694 |
| CN | 109076521 A | * | 12/2018 | ............ H04L 1/1861 |
| CN | 109474403 A | * | 3/2019 | ................ H04L 1/16 |
| CN | 105450369 B | * | 5/2019 | ............ H04J 3/1694 |
| CN | 109923811 A | * | 6/2019 | ............ H04L 1/0079 |
| CN | 109474403 B | * | 12/2020 | ................ H04L 1/16 |
| CN | 112583532 A | * | 3/2021 | ............ H04L 1/1806 |
| CN | 113169827 A | * | 7/2021 | ............ H04L 1/1812 |
| CN | 109923811 B | * | 11/2021 | ............ H04L 1/0079 |
| CN | 112583532 B | * | 4/2022 | ............ H04L 1/1806 |
| CN | 109478978 B | * | 6/2022 | ............ H04B 7/0413 |
| EP | 2661006 A2 | * | 11/2013 | ............ H04J 3/1694 |
| EP | 2661006 A4 | * | 6/2016 | |
| EP | 2661006 B1 | * | 1/2019 | ............ H04J 3/1694 |
| EP | 3751776 A1 | * | 12/2020 | ............ H04L 1/1812 |
| EP | 3876592 A1 | * | 9/2021 | ............ H04L 1/1819 |
| EP | 3920444 A1 | * | 12/2021 | ............ H04L 1/0003 |
| EP | 3451768 B1 | * | 5/2022 | ............ H04L 1/1861 |
| IL | 284908 A | * | 9/2021 | |
| JP | WO2017187810 A1 | * | 2/2019 | |
| JP | 2019537343 A | * | 12/2019 | |
| JP | 2020072330 A | * | 5/2020 | ............ H04L 1/1819 |
| JP | 6739521 B2 | * | 8/2020 | ............ H04L 1/1861 |
| JP | 6827537 B2 | * | 2/2021 | ............ H04L 1/0079 |
| KR | 101497851 B1 | * | 3/2015 | |
| KR | 102438685 B1 | * | 8/2020 | ............ H04L 1/1614 |
| KR | 102258539 B1 | * | 5/2021 | |
| KR | 20210124251 A | * | 10/2021 | |
| WO | WO-2012091490 A2 | * | 7/2012 | ............ H04J 3/1694 |
| WO | WO-2012091490 A3 | * | 8/2012 | ............ H04J 3/1694 |
| WO | WO-2017187810 A1 | * | 11/2017 | ............ H04L 1/1861 |
| WO | WO-2018085429 A1 | * | 5/2018 | ............ H04L 1/0079 |
| WO | WO-2019047590 A1 | * | 3/2019 | ................ H04L 1/16 |
| WO | WO-2020026296 A1 | * | 2/2020 | ............ H04L 1/1819 |
| WO | WO-2020026297 A1 | * | 2/2020 | ............ H04B 7/0456 |
| WO | WO-2020090366 A1 | * | 5/2020 | ............ H04L 1/1819 |
| WO | WO-2020167612 A1 | * | 8/2020 | ............ H04L 1/1614 |
| WO | WO-2022081621 A2 | * | 4/2022 | |

* cited by examiner

500 

505 — Obtain a counter downlink assignment index (cDAI) to be included in each of a plurality of downlink control information (DCI), each of a first subset of the plurality of DCI to be received on a control channel, and each of a second subset of the plurality of DCI to be received on a data channel, each of the first subset of the plurality of DCI scheduling one of the data channels, and wherein each of the control channels and the data channels is to be transmitted on a cell of a plurality of cells, the cDAIs being in accordance with an order of the cell, with respect to the plurality of cells, on which each of the cDAIs is to be received

510 — Process the control channels and data channels in accordance with the cDAIs.

FIG. 5

DOWNLINK ASSIGNMENT INDEX (DAI) UPDATES FOR PIGGYBACK DOWNLINK CONTROL INFORMATION (DCI)

CROSS REFERENCE TO RELATED APPLICATION

This Application hereby claims priority under 35 U.S.C. § 119 to U.S. Provisional Patent Application No. 63/025,752, filed on May 15, 2020, the contents of which are incorporated herein in their entirety.

FIELD OF THE DISCLOSURE

Aspects of the present disclosure relate to wireless communications, and more particularly, to techniques for data channel configuration.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for indicating a downlink assignment index (DAI).

Certain aspects of the subject matter described in this disclosure can be implemented in a method for wireless communications. The method generally includes determining a counter downlink assignment index (cDAI) to be included in each of a plurality of downlink control information (DCI) to be transmitted, each of a first subset of the plurality of DCI to be transmitted on a control channel, and each of a second subset of the plurality of DCI to be transmitted on a data channel, each of the first subset of the plurality of DCI scheduling one of the data channels, and wherein each of the control channels and the data channels is to be transmitted on a cell of a plurality of cells, the determination of the cDAIs being based on order of the cell, with respect to the plurality of cells, on which each of the cDAIs is to be transmitted; generating the control channels and data channels in accordance with the determination; and outputting the control channels and the data channels for transmission.

Certain aspects of the subject matter described in this disclosure can be implemented in a method for wireless communications. The method generally includes obtaining a counter downlink assignment index (cDAI) to be included in each of a plurality of downlink control information (DCI), each of a first subset of the plurality of DCI to be received on a control channel, and each of a second subset of the plurality of DCI to be received on a data channel, each of the first subset of the plurality of DCI scheduling one of the data channels, and wherein each of the control channels and the data channels is to be transmitted on a cell of a plurality of cells, the cDAIs being in accordance with an order of the cell, with respect to the plurality of cells, on which each of the cDAIs is to be received; and processing the control channels and data channels in accordance with the cDAIs.

Certain aspects of the subject matter described in this disclosure can be implemented in an apparatus for wireless communications. The apparatus generally includes means for determining a counter downlink assignment index (cDAI) to be included in each of a plurality of downlink control information (DCI) to be transmitted, each of a first subset of the plurality of DCI to be transmitted on a control channel, and each of a second subset of the plurality of DCI to be transmitted on a data channel, each of the first subset of the plurality of DCI scheduling one of the data channels, and wherein each of the control channels and the data channels is to be transmitted on a cell of a plurality of cells, the determination of the cDAIs being based on order of the cell, with respect to the plurality of cells, on which each of the cDAIs is to be transmitted, means for generating the control channels and data channels in accordance with the determination, and means for outputting the control channels and the data channels for transmission.

Certain aspects of the subject matter described in this disclosure can be implemented in an apparatus for wireless communications. The apparatus generally includes means for obtaining a counter downlink assignment index (cDAI) to be included in each of a plurality of downlink control information (DCI), each of a first subset of the plurality of DCI to be received on a control channel, and each of a second subset of the plurality of DCI to be received on a data channel, each of the first subset of the plurality of DCI scheduling one of the data channels, and wherein each of the control channels and the data channels is to be transmitted on a cell of a plurality of cells, the cDAIs being in accordance with an order of the cell, with respect to the plurality of cells, on which each of the cDAIs is to be received, and means for processing the control channels and data channels in accordance with the cDAIs.

Certain aspects of the subject matter described in this disclosure can be implemented in an apparatus for wireless communications. The apparatus generally includes a processing system configured to determine a counter downlink assignment index (cDAI) to be included in each of a plurality of downlink control information (DCI) to be transmitted, each of a first subset of the plurality of DCI to be transmitted on a control channel, and each of a second subset of the plurality of DCI to be transmitted on a data channel, each of the first subset of the plurality of DCI scheduling one of the data channels, and wherein each of the control channels and the data channels is to be transmitted on a cell of a plurality of cells, the determination of the cDAIs being based on order of the cell, with respect to the plurality of cells, on which each of the cDAIs is to be transmitted and generate the control channels and data channels in accordance with the determination, and an interface configured to output the control channels and the data channels for transmission.

Certain aspects of the subject matter described in this disclosure can be implemented in an apparatus for wireless communications. The apparatus generally includes an interface configured to obtain a counter downlink assignment index (cDAI) to be included in each of a plurality of downlink control information (DCI), each of a first subset of the plurality of DCI to be received on a control channel, and each of a second subset of the plurality of DCI to be received on a data channel, each of the first subset of the plurality of DCI scheduling one of the data channels, and wherein each of the control channels and the data channels is to be transmitted on a cell of a plurality of cells, the cDAIs being in accordance with an order of the cell, with respect to the plurality of cells, on which each of the cDAIs is to be received, and a processing system configured to process the control channels and data channels in accordance with the cDAIs.

Certain aspects of the subject matter described in this disclosure can be implemented in a base station. The base station generally includes a processing system configured to determine a counter downlink assignment index (cDAI) to be included in each of a plurality of downlink control information (DCI) to be transmitted, each of a first subset of the plurality of DCI to be transmitted on a control channel, and each of a second subset of the plurality of DCI to be transmitted on a data channel, each of the first subset of the plurality of DCI scheduling one of the data channels, and wherein each of the control channels and the data channels is to be transmitted on a cell of a plurality of cells, the determination of the cDAIs being based on order of the cell, with respect to the plurality of cells, on which each of the cDAIs is to be transmitted and generate the control channels and data channels in accordance with the determination, and a transmitter configured to transmit the control channels and the data channels.

Certain aspects of the subject matter described in this disclosure can be implemented in a user equipment. The user equipment generally includes a receiver configured to receive a counter downlink assignment index (cDAI) to be included in each of a plurality of downlink control information (DCI), each of a first subset of the plurality of DCI to be received on a control channel, and each of a second subset of the plurality of DCI to be received on a data channel, each of the first subset of the plurality of DCI scheduling one of the data channels, and wherein each of the control channels and the data channels is to be transmitted on a cell of a plurality of cells, the cDAIs being in accordance with an order of the cell, with respect to the plurality of cells, on which each of the cDAIs is to be received, and a processing system configured to process the control channels and data channels in accordance with the cDAIs.

Certain aspects of the subject matter described in this disclosure can be implemented in a computer-readable medium for wireless communications. The computer-readable medium generally includes determine a counter downlink assignment index (cDAI) to be included in each of a plurality of downlink control information (DCI) to be transmitted, each of a first subset of the plurality of DCI to be transmitted on a control channel, and each of a second subset of the plurality of DCI to be transmitted on a data channel, each of the first subset of the plurality of DCI scheduling one of the data channels, and wherein each of the control channels and the data channels is to be transmitted on a cell of a plurality of cells, the determination of the cDAIs being based on order of the cell, with respect to the plurality of cells, on which each of the cDAIs is to be transmitted, generate the control channels and data channels in accordance with the determination, and output the control channels and the data channels for transmission.

Certain aspects of the subject matter described in this disclosure can be implemented in a computer-readable medium for wireless communications. The computer-readable medium generally includes obtain a counter downlink assignment index (cDAI) to be included in each of a plurality of downlink control information (DCI), each of a first subset of the plurality of DCI to be received on a control channel, and each of a second subset of the plurality of DCI to be received on a data channel, each of the first subset of the plurality of DCI scheduling one of the data channels, and wherein each of the control channels and the data channels is to be transmitted on a cell of a plurality of cells, the cDAIs being in accordance with an order of the cell, with respect to the plurality of cells, on which each of the cDAIs is to be received, and process the control channels and data channels in accordance with the cDAIs.

Aspects of the present disclosure provide base stations, UEs, processing systems, means for, apparatuses, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 is a flow diagram illustrating example operations for wireless communication, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
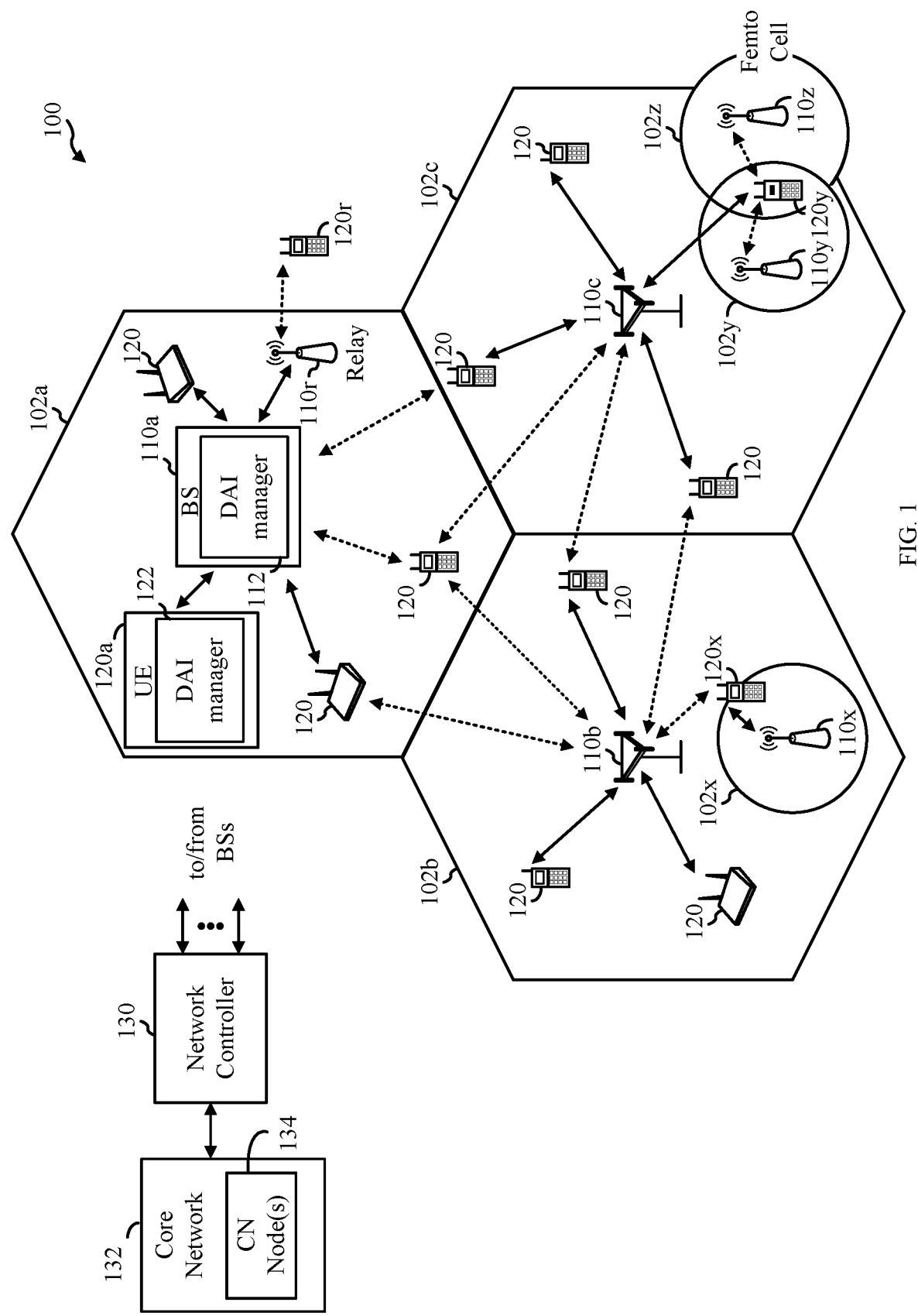
FIG. 1 is a block diagram conceptually illustrating an example telecommunications system, in accordance with certain aspects of the present disclosure.

Aspects of the present disclosure provide apparatus, methods, processing systems, and computer readable mediums for indicating a downlink assignment index (DAI) for piggyback downlink control information (DCI).

The following description provides examples of techniques for indicating DAI in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. A network controller 130 may couple to a set of BSs 110 and provide coordination and control for these BSs 110 (e.g., via a backhaul).

The BSs 110 communicate with UEs 120*a*-*y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for indicating a downlink assignment index (DAI). As shown in FIG. 1, the BS 110*a* includes a DAI manager 112. The DAI manager 112 may be configured to indicate DAIS in regulator and piggyback downlink control information (DCI), in accordance with aspects of the present disclosure. As shown in FIG. 1, the UE 120*a* includes a DAI manager 122. The DAI manager 122 may be configured to receive DAIs in regular and piggyback DCIs, in accordance with aspects of the present disclosure.

Figure 2:
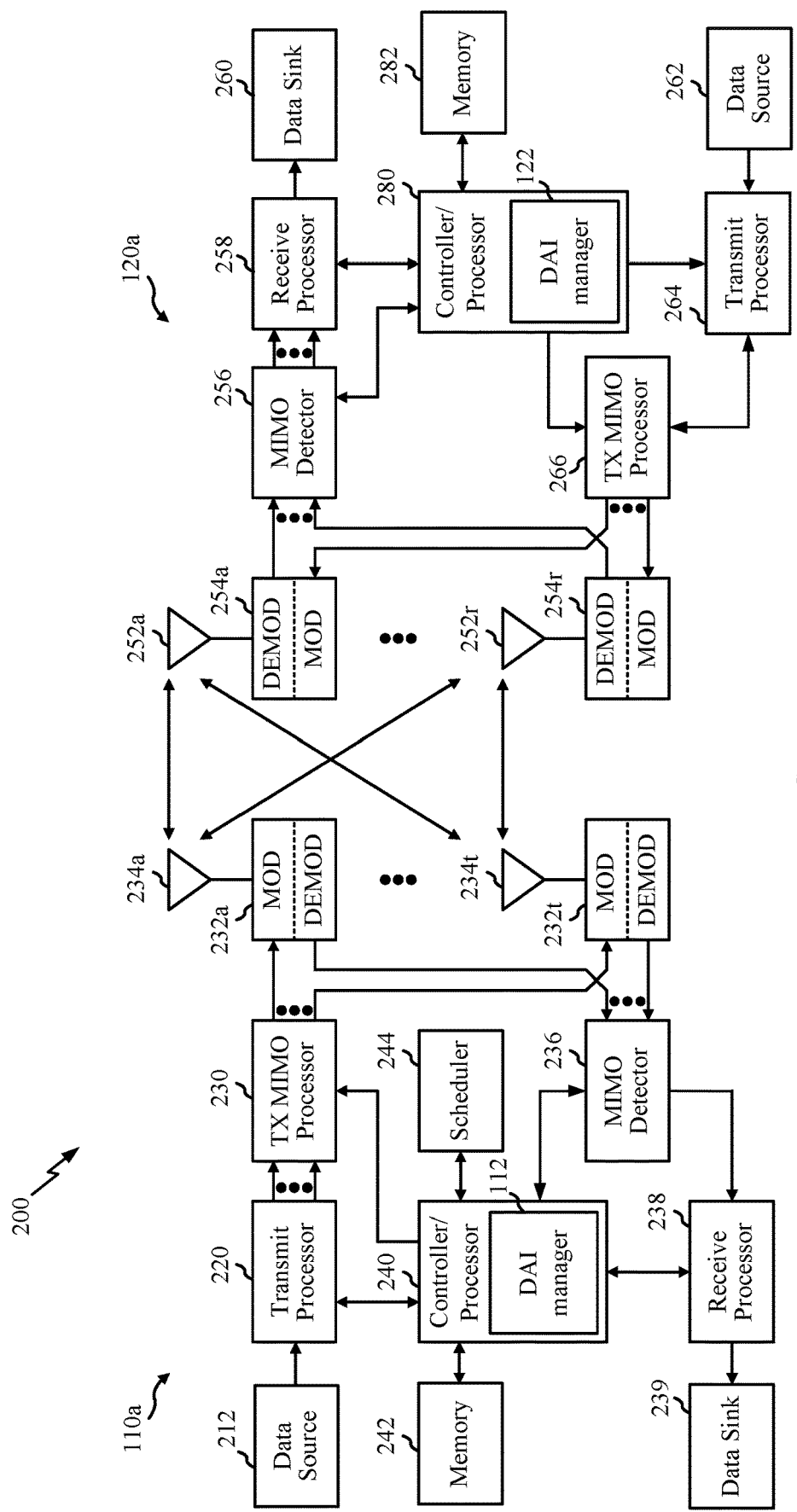
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 240 of the BS 110*a* has a DAI manager 112, according to aspects described herein. As shown in FIG. 2, the controller/processor 280 of the UE 120*a* has DAI manager 122, according to aspects described herein. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
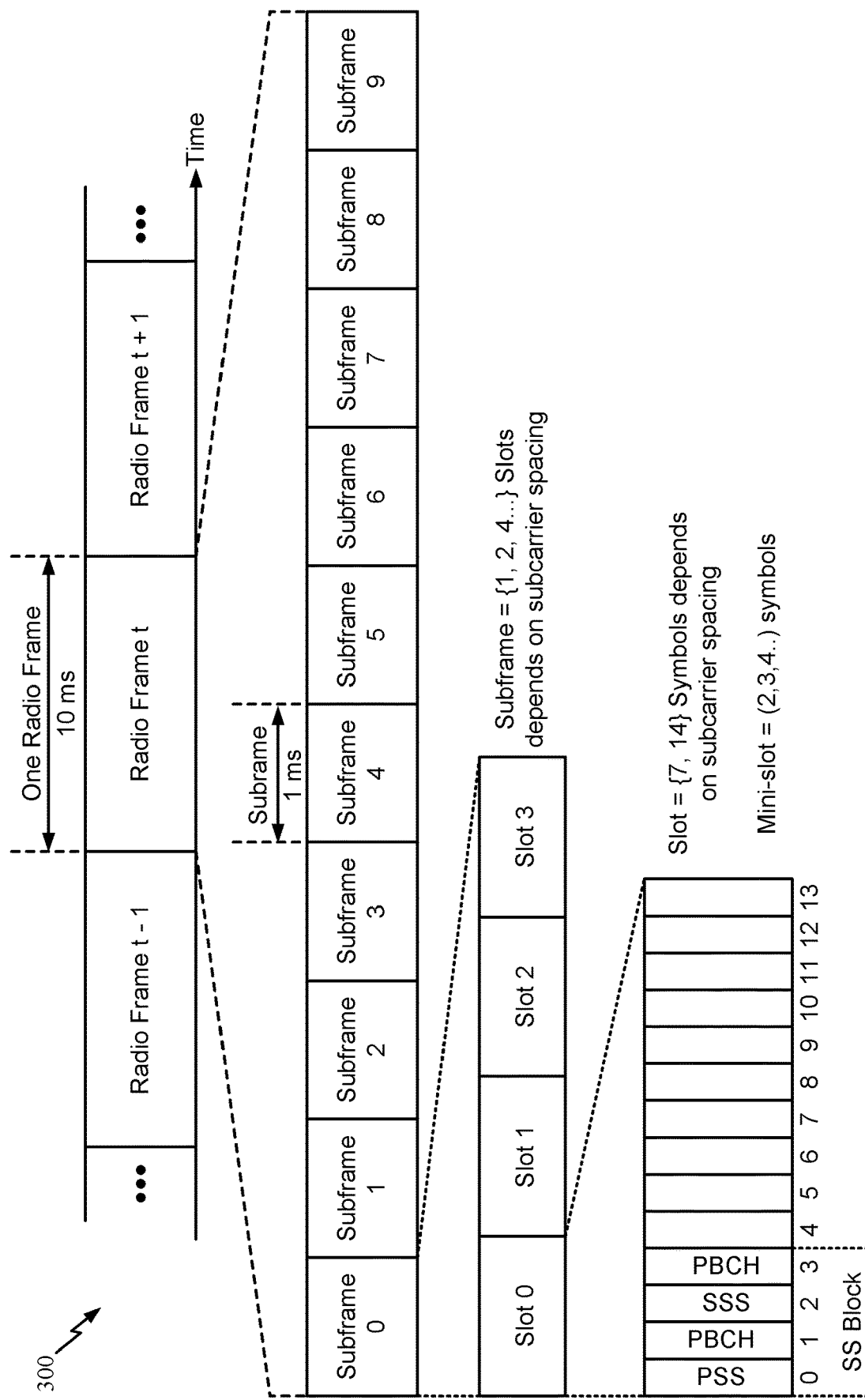
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Techniques for Indicating Downlink Assignment Index

In certain implementations, downlink control information (DCI) may be communicated on a physical downlink shared channel (PDSCH) (also referred to as a data channel). Higher communication bands, such as a 60 GHz band, may have shorter slot durations as compared to lower bands, such as frequency range (FR) 1 and FR2, due to the higher subcarrier spacing (SCS) (e.g., 960 kHz, 1.92 MHz, 3.84 MHz) associated with the higher bands. Thus, the number of physical downlink control channel (PDCCH) monitoring occasions may increase, leading to high power consumption. Due to the short slot duration and narrow analog beamforming transmission on higher bands, the chance of sending multiple DCIs to different UEs is reduced as compared to FR1/FR2. Instead, it may be more likely for a BS (e.g., gNB) to send multiple DCIs to the same UE (e.g., in particular for bursty traffic). Thus, DCI may be transmitted on a data channel in order to reduce control channel monitoring density for a better micro sleep schedule at the UE, reducing power consumption.

DCI piggybacking provides for a more efficient delivery of DCI, by sharing the PDSCH beam, precoding, and demodulation reference signal (DMRS). DCI piggybacking also provides for higher efficiency PDSCH transmission, with certain UEs only rate matching around the DCIs when receiving the PDSCH. Certain aspects of the present disclosure provide techniques for indicating a downlink assignment index (DAI) for piggyback DCIs.

Figure 4:
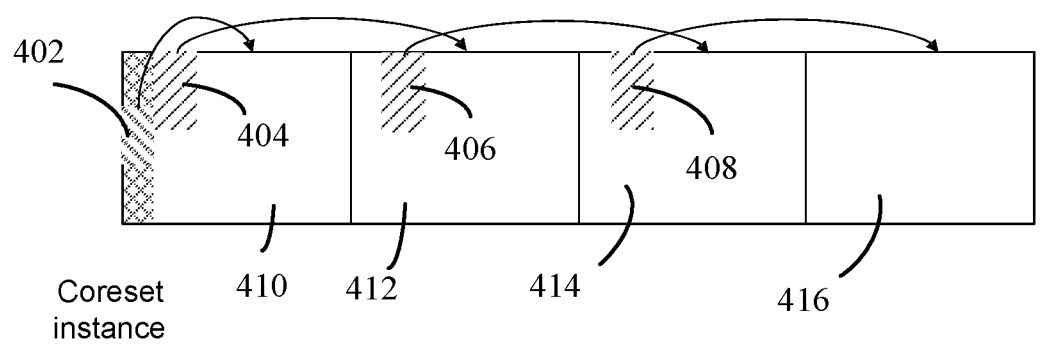
FIG. 4 illustrates piggybacked downlink control information (DCI) forming a scheduling chain, in accordance with certain aspects of the present disclosure.

FIG. 4 illustrates piggybacked DCIs forming a scheduling chain, in accordance with certain aspects of the present disclosure. As illustrated, a control resource set (CORESET) including DCI 402 may schedule resources for PDSCH 410. A DCI transmitted on a control channel in a CORESET is referred to as a regulator DCI. The PDSCH 410 may include a DCI 404 that schedules resources for PDSCH 412. The PDSCH 412 may include a DCI 406 that schedules resources for PDSCH 414. The PDSCH 414 includes DCI 408 which schedules resources for PDSCH 416. DCIs 404, 406, 408 are referred to as piggybacked DCIS because they are indicated on PDSCH. Moreover, DCIS 404, 406, 408 form a scheduling chain.

Certain aspects of the present disclosure are directed to techniques for indicating a downlink assignment index (DAI) for a piggyback DCI, as described in more detail herein. A DAI is an index, which is communicated to UE by a BS to prevent acknowledgement (ACK)/negative acknowledgment (NACK) reporting errors due to a hybrid automatic repeat request (HARQ) ACK/NAK bundling procedure performed by the UE.

DAI is applicable when HARQ-ACK codebook size determination is dynamic and is used to reduce codebook size errors due to PDCCH detection failure. For example, each DCI may indicate a counter DAI (cDAI) and total DAI (tDAI). cDAI generally denotes the accumulative number of {serving-cell, PDCCH monitoring occasion} pairs in which PDSCH reception (or SPS PDSCH release) is present, up to the serving cell and the current PDCCH monitoring occasion in the order of first serving cell and next PDCCH monitoring occasion. tDAI generally denotes the total number of {serving cell, PDCCH monitoring occasion} pairs, up to the current monitoring occasion and is updated from one monitoring occasion to the next.

FIG. 5 is a flow diagram illustrating example operations 500 for wireless communication, in accordance with certain aspects of the present disclosure. The operations 500 may be performed, for example, by a UE (e.g., such as a UE 120a in the wireless communication network 100).

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, with the UE receiving a cDAI to be included in each of a plurality of DCI, each of a first subset of the plurality of DCI to be received on a control channel, and each of a second subset of the plurality of DCI to be received on a data channel, each of the first subset of the plurality of DCI scheduling one of the data channels, and wherein each of the control channels and the data channels is to be transmitted on a cell of a plurality of cells, the cDAIs being in accordance with an order of the cell, with respect to the plurality of cells, on which each of the cDAIs is to be received. At block 510, the UE processes the control channels and data channels in accordance with the cDAIs.

Figure 6:
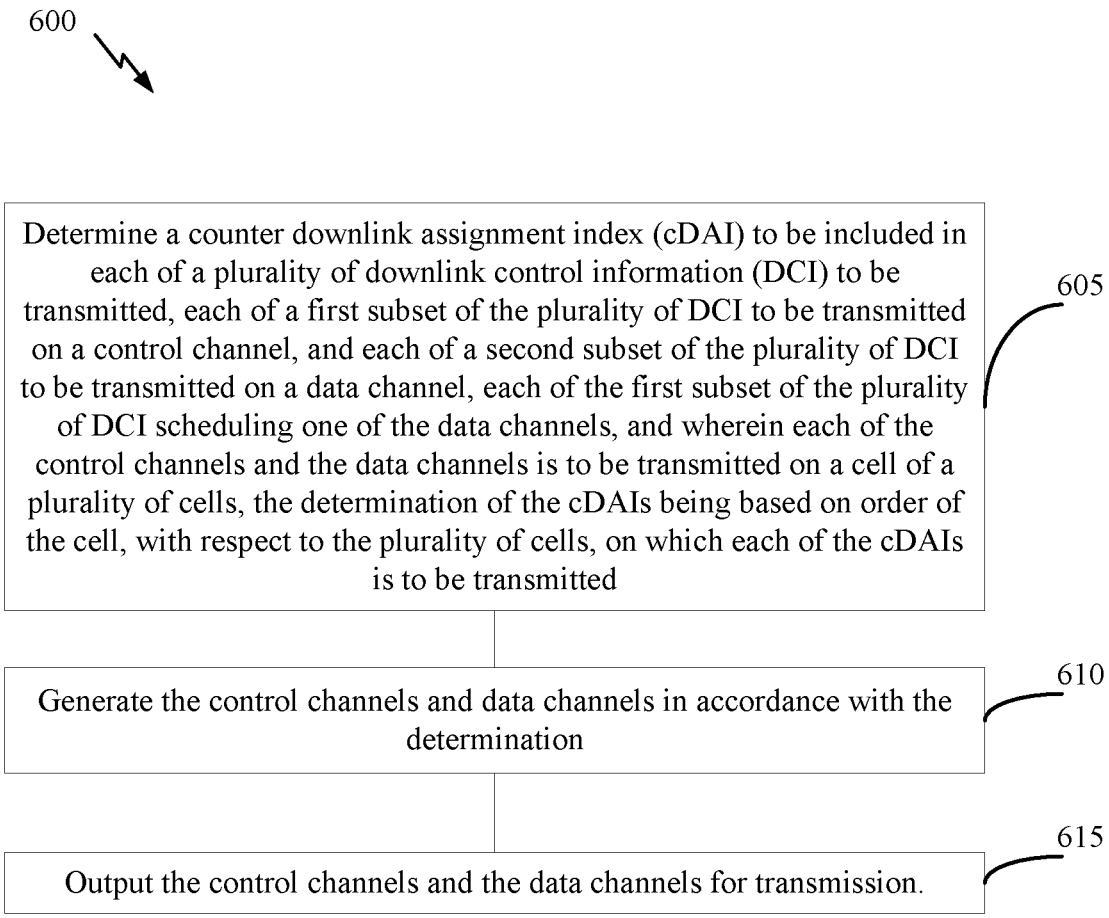
FIG. 6 is a flow diagram illustrating example operations for wireless communication, in accordance with certain aspects of the present disclosure.

FIG. 6 is a flow diagram illustrating example operations 600 for wireless communication, in accordance with certain aspects of the present disclosure. The operations 600 may be performed, for example, by a BS (e.g., such as the BS 110a in the wireless communication network 100).

Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at block 605, with the BS determining a cDAI to be included in each of a plurality of DCI to be transmitted, each of a first subset of the plurality of DCI to be transmitted on a control channel, and each of a second subset of the plurality of DCI to be transmitted on a data channel, each of the first subset of the plurality of DCI scheduling one of the data channels, and wherein each of the control channels and the data channels is to be transmitted on a cell of a plurality of cells, the determination of the cDAIs being based on order of the cell, with respect to the plurality of cells, on which each of the cDAIs is to be transmitted. At block 610, the BS generates the control channels and data channels in accordance with the determination, and at block 615, outputs the control channels and the data channels for transmission.

Figure 7:
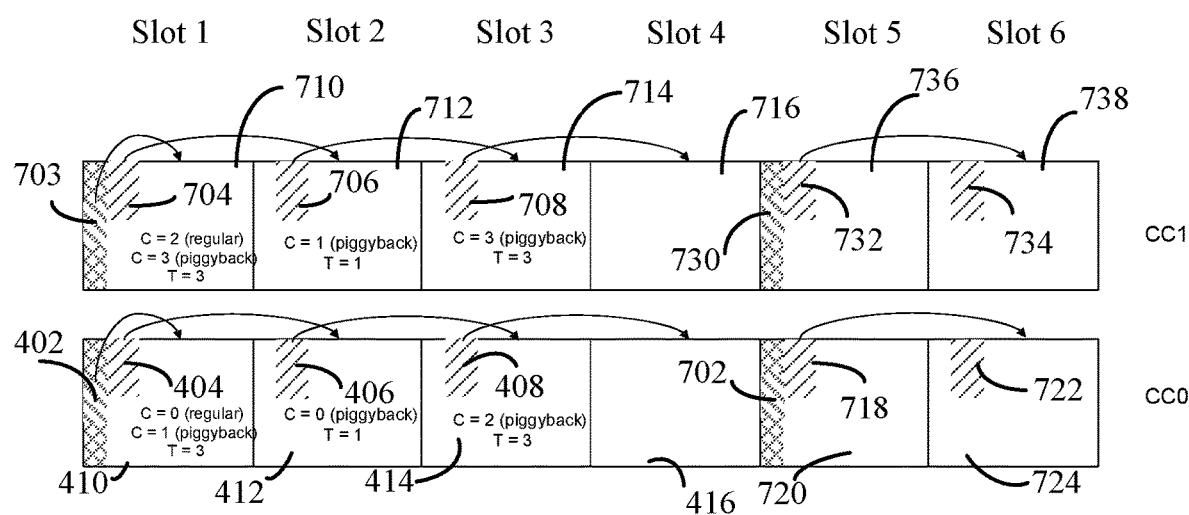
FIG. 7 illustrates piggyback DCIs across multiple component carriers (CCs) (e.g., cells), each indicating a DAI, in accordance with certain aspects of the present disclosure.

FIG. 7 illustrates piggyback DCIs across multiple component carriers (CCs) (e.g., cells), each indicating a DAI, in accordance with certain aspects of the present disclosure. The scheduling chain including piggyback DCIs 404, 406, 408 is on component carrier 0 (CC0) and begins with DCI 402 in a CORESET that schedules the PDSCH 410 on which DCI 404 is transmitted. A subsequent DCI 702 on CC0 and in another CORESET may begin another scheduling chain that includes piggyback DCIs 718, 722. As illustrated, DCI 718 is transmitted on PDSCH 720 and schedules PDSCH 724, where DCI 722 is transmitted on PDSCH 724.

As illustrated, a scheduling chain including piggybacked DCIs 704, 706, 708 may be on component carrier 1 (CC1) and begins with DCI 703 on a CORESET that schedules the PDSCH 710 on which DCI 704 is transmitted. DCI 706 may be transmitted on PDSCH 712, and DCI 708 may be transmitted on PDSCH 714 and schedule PDSCH 716, as illustrated. A subsequent DCI 730 on a CORESET on CC1 may begin another scheduling chain that includes piggyback DCIs 732, 734. As illustrated, DCI 732 is transmitted on PDSCH 736 and schedules PDSCH 738, where DCI 734 is transmitted on PDSCH 738. A DCI transmitted on a PDSCH is referred to as a piggyback DCI, and a DCI transmitted on PDCCH (e.g., CORESET) is referred to as a regular DCI, as described herein.

In certain aspects, each of the DCIs may include a cDAI that is incremented in order of serving cell, {PDCCH monitoring occasion in CORESET, piggyback PDCCH monitoring occasion in PDSCH}, and a tDAI that is the total number of PDCCHs in the PDCCH monitoring occasion and in the piggyback DCI in the slot across all serving cells.

For example, determining the cDAIs, at block 605 of FIG. 6, may include incrementing each of one or more of the cDAIs based on the order of the cell. For example, as illustrated in FIG. 7, the regular DCI 402 may include a cDAI of 0, the DCI 404 may include a cDAI of 1, the DCI 703 may include a cDAI of 2, and the DCI 704 may include a cDAI of 3. The cDAI may be a 2-bit field which indicates the cDAI using modulo 3. In other words, the cDAI of DCI 704 may be incremented to determine the cDAI for DCI 406. But since cDAI is a 2-bit field, the cDAI may revert back to 0. That is, DCI 406 may include a cDAI of 0, DCI 706 may include a cDAI of 1, the DCI 408 may include a cDAI 2, and DCI 708 may include a cDAI of 3.

In certain aspects, each of the DCIs may also include a tDAI. For example, the BS may also determine a tDAI to be included in each DCI of a plurality of DCI, the tDAI being determined based on a total quantity of the plurality of DCI to be transmitted in a slot in which the DCI is to be transmitted. In certain aspects, the tDAI may indicate a total quantity of the plurality of DCI to be transmitted in the slot in which the DCI is to be transmitted and one or more other slots prior to the slot on which the DCI is to be transmitted.

For example, as illustrated in FIG. 7, each of the DCIs in slot 1 may include a tDAI indicating the total number of DCIs in slot 1. In other words, each of DCIs 402, 404, 703, 704 may include a tDAI of 3 (e.g., representing a total of 4 DCIs). Each of the DCIs 406, 706 in slot 2 may include a tDAI indicating the total number of DCIs in slot 1 and slot 2. In other words, the DCI 406 and DCI 706 each include a tDAI of 1. That is, to determine the tDAI in each of DCI 406 and DCI 706, tDAI of 3 in DCIs of slot 1 are incremented twice since there are two DCIs in slot 2, resulting in a tDAI of 1 for DCIs 406, 706 since tDAI is implemented using modulo 3 with 2 bits.

Figure 8:
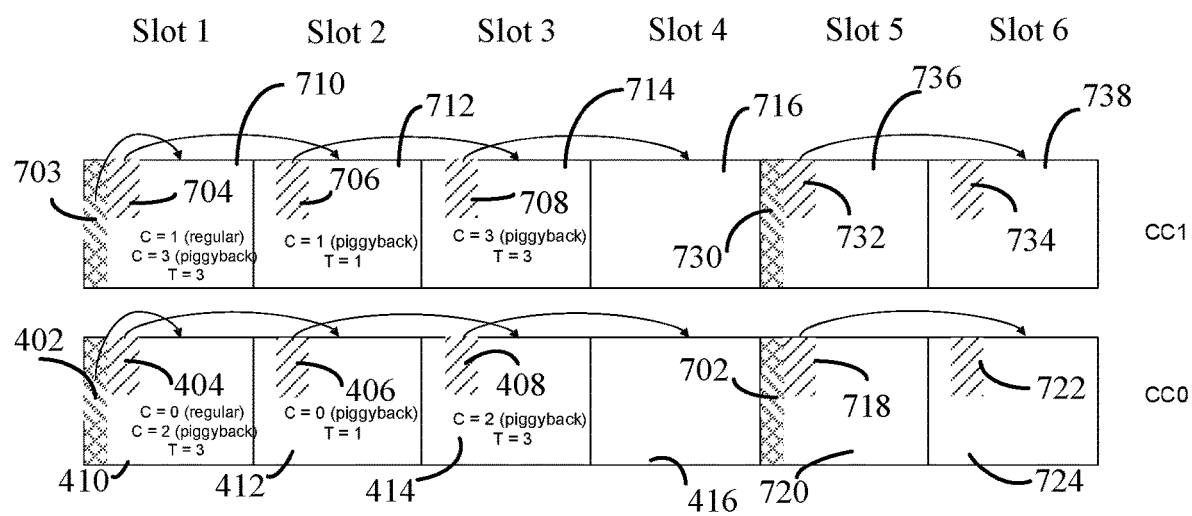
FIG. 8 illustrates piggyback DCIs across multiple CCs, each indicating a DAI incremented starting with a control channel monitoring occasions in a slot followed by piggyback DCIs in the slot, in accordance with certain aspects of the present disclosure.

FIG. 8 illustrates piggyback DCIs across multiple CCs, each indicating a DAI incremented starting with a PDCCH monitoring occasions in a slot followed by piggyback DCIs in the slot, in accordance with certain aspects of the present disclosure. In other words, in this case, cDAI is incremented in order of serving cell, starting with all PDCCH monitoring occasions followed by all DCI piggybacks. Moreover, the tDAI is the total number of PDCCHs in the PDCCH monitoring occasion and in the piggyback DCI in the slot across all serving cells.

For example, incrementing each of one or more of the cDAIs may include incrementing one or more of the cDAIs starting with cDAIs to be transmitted in the first subset of DCIs (e.g., regular DCIs), followed by cDAIs to be transmitted in a second subset of DCIs (e.g., piggyback DCIs). For example, as illustrated in FIG. 8, DCI 402 includes a cDAI of 0, DCI 703 includes a cDAI of 1, DCI 404 includes a cDAI 2, and DCI 704 includes a cDAI of 3, DCI 406 includes a cDAI of 0, DCI 706 includes a cDAI of 1, DCI 408 includes a cDAI of 2, and DCI 708 includes a cDAI of 3.

Figure 9:
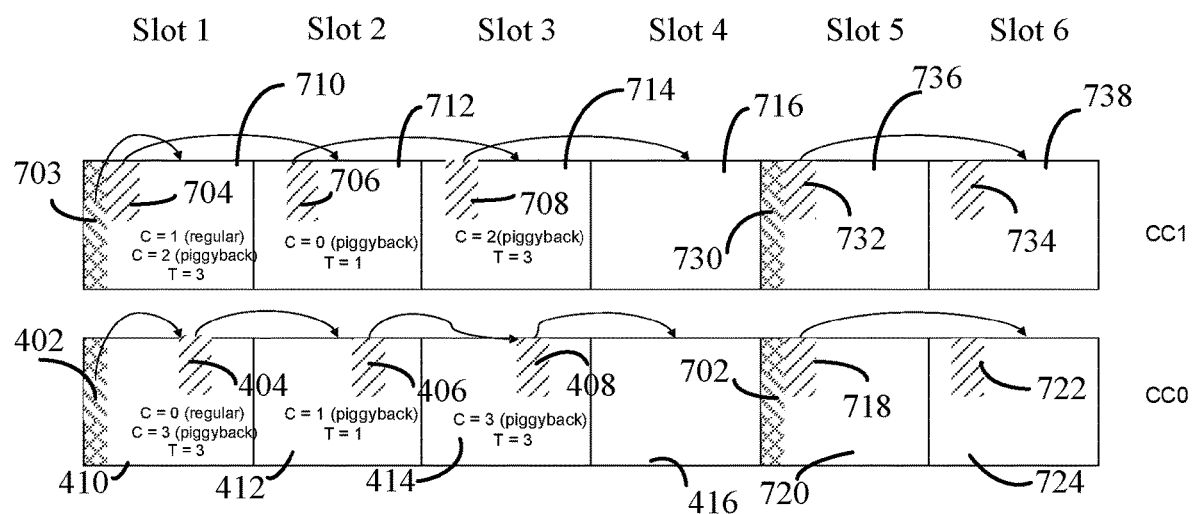
FIG. 9 illustrates piggyback DCIs across multiple CCs, each indicating a DAI incremented starting with the DCI first in time, in accordance with certain aspects of the present disclosure.

FIG. 9 illustrates piggyback DCIs across multiple CCs, each indicating a DAI incremented starting with the DCI first in time, in accordance with certain aspects of the present disclosure. In other words, in this case, cDAI is incremented in order of serving cell, and PDCCH start occasion (e.g., either regular or piggyback DCI). That is, the cDAIs may be incremented using a fully start time based technique. Moreover, the tDAI in each DCI is the total number of PDCCHs in the PDCCH monitoring occasion and in the piggyback DCI in the slot across all serving cells.

As illustrated in FIG. 9, DCI 402 includes a cDAI of 0, DCI 703 includes a cDAI of 1, DCI 704 includes a cDAI 2, and DCI 404 includes a cDAI of 3. In other words, since DCI 404 starts after DCI 704, DCI 704 includes cDAI of 2, and DCI 404 includes a cDAI of 3. Similarly, DCI 706 includes a cDAI of 0, DCI 406 includes a cDAI of 1, DCI 708 includes a cDAI of 2, and DCI 408 includes a cDAI of 3.

Figure 10:
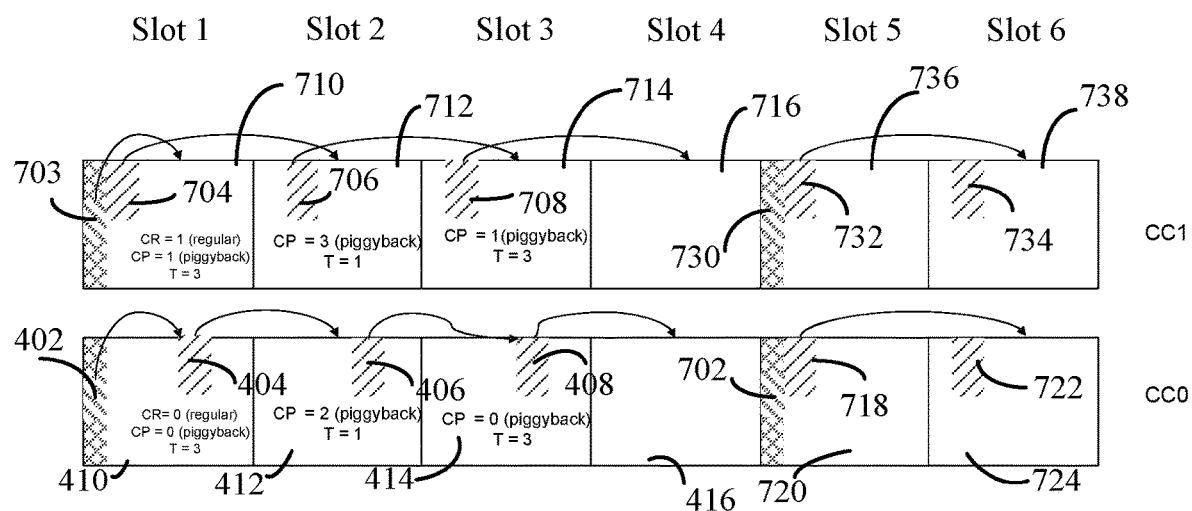
FIG. 10 illustrates piggyback DCIs across multiple CCs, implemented with separate DAIS for regular DCIs and piggyback DCIs, in accordance with certain aspects of the present disclosure.

FIG. 10 illustrates piggyback DCIs across multiple CCs, implemented with separate DAIs for regular DCIs and piggyback DCIs, in accordance with certain aspects of the present disclosure. In other words, in this case, a counter regular DAI (crDAI) is included in each regular DCI and is incremented in order of serving cell and regular PDCCH start occasion. Moreover, a counter piggyback DAI (cpDAI) is included in each piggyback DCI and is incremented in order of serving cell and piggyback DCI. Moreover, the tDAI in each DCI is the total number of PDCCHs in the PDCCH monitoring occasion and in the piggyback DCI in the slot across all serving cells.

That is, determining the cDAI, at block 605 of FIG. 6, to be included in each of the plurality of DCI may include determining a first cDAI (e.g., crDAI) to be included in each of the first subset (e.g., regular DCIs) of the plurality of DCI and a second cDAI (e.g., cpDAI) to be included in each of the second subset (e.g., piggyback DCIs) of plurality of DCI. The BS may increment each of one or more of the first cDAIs based on the order of the cell on which the first cDAI is to be transmitted, and increment each of one or more of the second cDAIs based on the order of the cell on which the second cDAI is to be transmitted. For example, as illustrated in FIG. 10, DCI 402 includes a crDAI of 0, DCI 702 includes a crDAI of 1, DCI 404 includes a cpDAI of 0, and DCI 704 includes a cpDAI of 1, DCI 406 includes a cpDAI of 2, DCI 706 includes a cpDAI of 3, DCI 408 includes a cpDAI of 0, and DCI 708 includes a cpDAI of 1.

Figure 11:
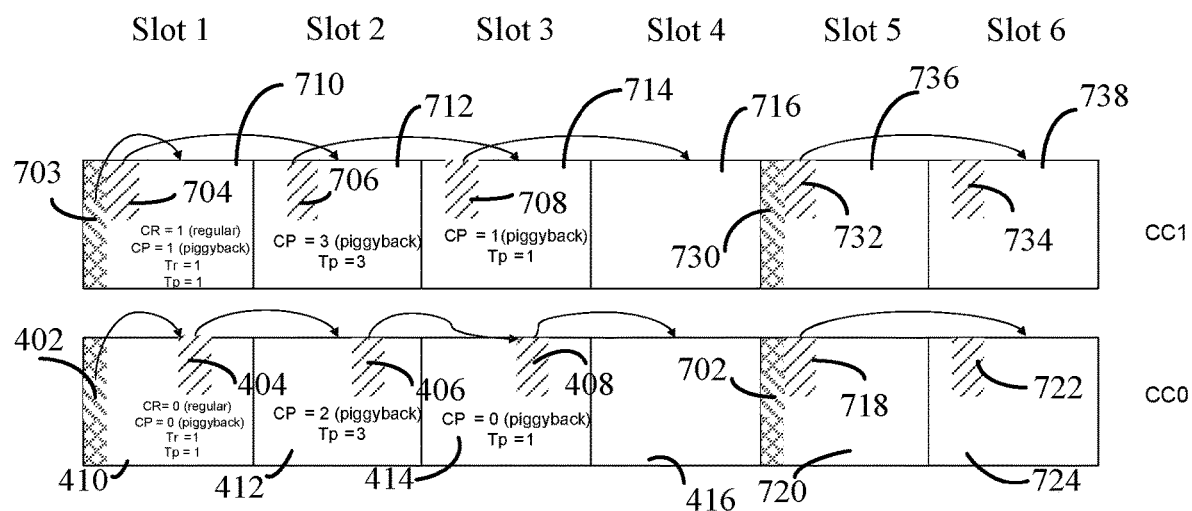
FIG. 11 illustrates piggyback DCIs across multiple CCs, implemented with separate counter DAIS and total DAIS for regular DCIs and piggyback DCIs, in accordance with certain aspects of the present disclosure.

FIG. 11 illustrates piggyback DCIs across multiple CCs, implemented with separate cDAIs and tDAIs for regular DCIs and piggyback DCIs, in accordance with certain aspects of the present disclosure. In other words, in this case, a total regular DAI (trDAI) is included in each regular DCI. Moreover, a total piggyback DAI (tpDAI) is included in each piggyback DCI.

That is, the BS may determine a first tDAI (e.g., trDAI) to be included in each first DCI of the first subset (e.g., regulator DCIs) of the plurality of DCI, the first tDAI being determined based on a total quantity of the first subset (e.g., regulator DCIs) of the plurality of DCI to be transmitted in a slot in which the first DCI is to be transmitted, and a second tDAI (e.g., tpDAI) to be included in each second DCI of the second subset (e.g., piggyback DCIs) of the plurality of DCI, the second tDAI being determined based on the total quantity of the second subset of the plurality of DCI to be transmitted in a slot in which the second DCI is to be transmitted. For example, as illustrated in FIG. 11, each of DCIs 402, 703 include a trDAI of 1 indicating the total number of regular DCIs in slot 1, and each of DCIs 404, 704 includes a tpDAI of 1, indicating the total number of piggyback DCIs in slot 1. Moreover, each of the piggyback DCIs 406, 706 include a tpDAI of 3, indicating the total number of piggyback DCIs in slots 1 and 2.

There may be multiple PDCCHs in a piggyback region in addition to multiple PDCCHs in a regular monitoring occasion. Thus, in some implementations, having 2-bits for tDAI. Thus, the number of bits for tDAI (or cDAI) (e.g., in regulator DCI or piggyback DCI) may be increased to 3 bits, or more, in some aspects. Piggyback DCI can also carry larger number of bits.

Figure 12:
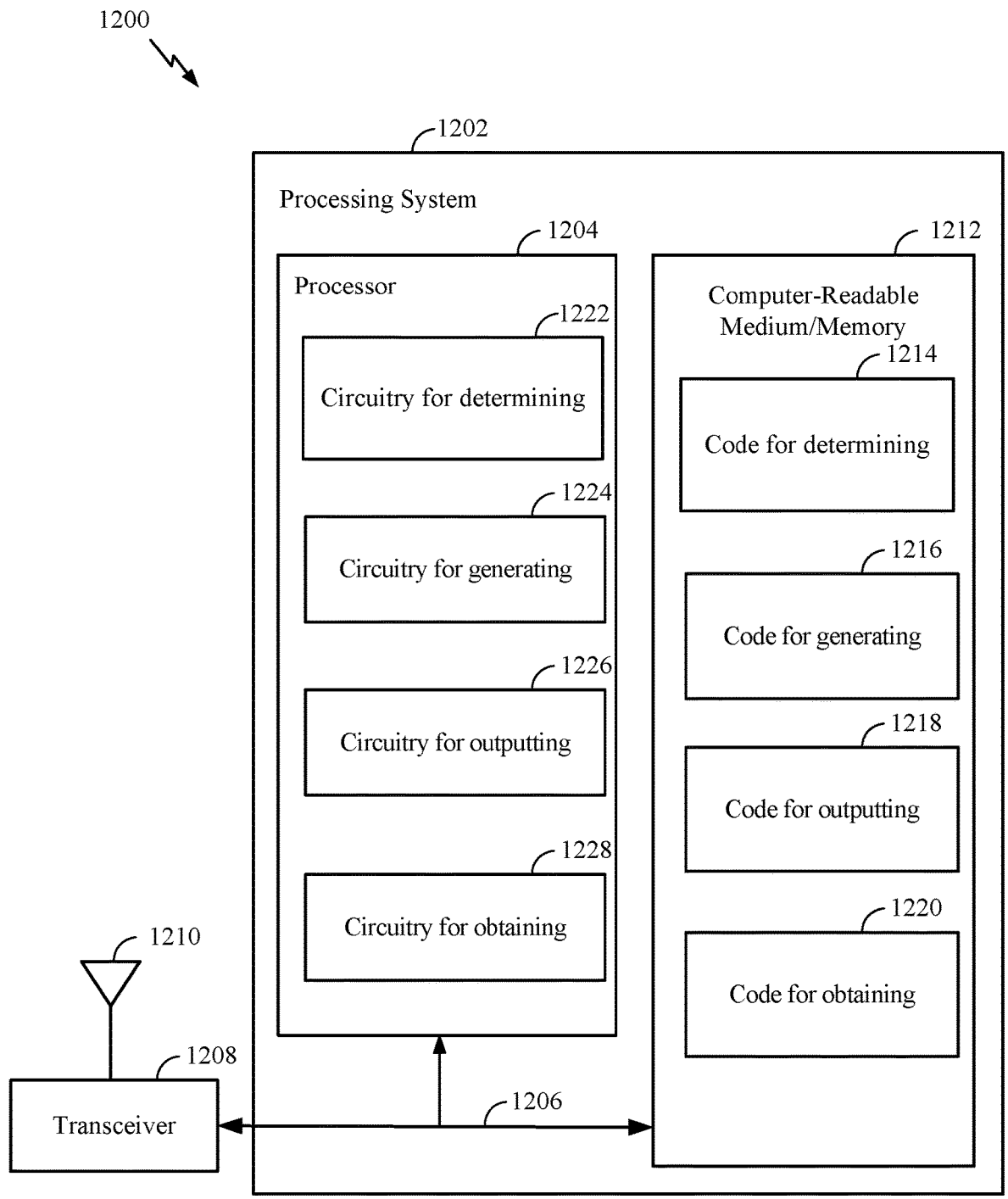
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIGS. 5-6. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIGS. 5-6, or other operations for performing the various techniques discussed herein for indicating DAI. In certain aspects, computer-readable medium/memory 1212 stores code 1214 for determining; code 1216 for generating; code 1218 for outputting; and code 1220 for obtaining. In certain aspects, the processor 1204 has circuitry configured to implement the code stored in the computer-readable medium/memory 1212. The processor 1204 includes circuitry 1222 for determining; circuitry 1224 for generating; circuitry 1226 for outputting; and circuitry 1228 for obtaining.

In addition to the various aspects described above, aspects of specific combinations are within the scope of the disclosure, some of which are detailed below:

Aspect 1: A method for wireless communications, comprising: determining a counter downlink assignment index (cDAI) to be included in each of a plurality of downlink control information (DCI) to be transmitted, each of a first subset of the plurality of DCI to be transmitted on a control channel, and each of a second subset of the plurality of DCI to be transmitted on a data channel, each of the first subset of the plurality of DCI scheduling one of the data channels, and wherein each of the control channels and the data channels is to be transmitted on a cell of a plurality of cells, the determination of the cDAIs being based on order of the cell, with respect to the plurality of cells, on which each of the cDAIs is to be transmitted; generating the control channels and data channels in accordance with the determination; and outputting the control channels and the data channels for transmission.

Aspect 2: The method of Aspect 1, wherein determining the cDAIs comprises incrementing each of one or more of the cDAIs based on the order of the cell.

Aspect 3: The method of Aspect 2, wherein incrementing each of the one or more of the cDAIs comprises incrementing the one or more of the cDAIs starting with cDAIs to be transmitted in the first subset, followed by cDAIs to be transmitted in the second subset.

Aspect 4: The method of Aspect 2, wherein incrementing each of the one or more of the cDAIs comprises incrementing the one or more of the cDAIs starting with cDAIs to be transmitted first in time.

Aspect 5: The method of any one of Aspects 1-4, wherein: determining the cDAI to be included in each of the plurality of DCI comprises determining a first cDAI to be included in each of the first subset of the plurality of DCI and a second cDAI to be included in each of the second subset of plurality of DCI; and the method further comprises incrementing each of one or more of the first cDAIs based on the order of the cell on which the first cDAI is to be transmitted and incrementing each of one or more of the second cDAIs based on the order of the cell on which the second cDAI is to be transmitted.

Aspect 6: The method of any one of Aspects 1-5, further comprising determining a total downlink assignment index (tDAI) to be included in each DCI of the plurality of DCI, the tDAI being determined based on a total quantity of the plurality of DCI to be transmitted in a slot in which the DCI is to be transmitted.

Aspect 7: The method of Aspect 6, wherein the tDAI indicates a total quantity of the plurality of DCI to be transmitted in the slot in which the DCI is to be transmitted and one or more other slots prior to the slot on which the DCI is to be transmitted.

Aspect 8: The method of Aspect 6, wherein the tDAI comprises at least three bits.

Aspect 9: The method of any one of Aspects 1-8, further comprising determining: a first tDAI to be included in each first DCI of the first subset of the plurality of DCI, the first tDAI being determined based on a total quantity of the first subset of the plurality of DCI to be transmitted in a slot in which the first DCI is to be transmitted; and a second tDAI to be included in each second DCI of the second subset of the plurality of DCI, the second tDAI being determined based on the total quantity of the second subset of the plurality of DCI to be transmitted in a slot in which the second DCI is to be transmitted.

Aspect 10: The method of Aspect 9, wherein: the first tDAI indicates the total quantity of the first subset of the plurality of DCI to be transmitted in the slot in which the first DCI is to be transmitted and one or more other slots prior to the slot on which the first DCI is to be transmitted; and the second tDAI indicates the total quantity of the second subset of the plurality of DCI to be transmitted in the slot in which the second DCI is to be transmitted and one or more other slots prior to the slot on which the second DCI is to be transmitted.

Aspect 11: The method of any one of Aspects 1-10, wherein the cDAI comprises at least three bits.

Aspect 12: The method of any one of Aspects 1-11, wherein each of the second subset of plurality of DCI to be transmitted on the data channel schedules another one of the data channels.

Aspect 13: A method for wireless communications, comprising: obtaining a counter downlink assignment index (cDAI) to be included in each of a plurality of downlink control information (DCI), each of a first subset of the plurality of DCI to be received on a control channel, and each of a second subset of the plurality of DCI to be received on a data channel, each of the first subset of the plurality of DCI scheduling one of the data channels, and wherein each of the control channels and the data channels is to be transmitted on a cell of a plurality of cells, the cDAIs being in accordance with an order of the cell, with respect to the plurality of cells, on which each of the cDAIs is to be received; and processing the control channels and data channels in accordance with the cDAIs.

Aspect 14: The method of Aspect 13, wherein each of one or more of the cDAIs is incremented based on the order of the cell.

Aspect 15: The method of Aspect 14, wherein the one or more of the cDAIs are incremented starting with cDAIs to be obtained in the first subset, followed by cDAIs to be obtained in the second subset.

Aspect 16: The method of Aspect 14, wherein the one or more of the cDAIs are incremented starting with cDAIs to be obtained first in time.

Aspect 17: The method of any one of Aspects 13-16, wherein: a first cDAI is included in each of the first subset of the plurality of DCI and a second cDAI is included in each of the second subset of plurality of DCI; each of one or more of the first cDAIs is incremented based on the order of the cell on which the first cDAI is to be obtained; and each of one or more of the second cDAIs is incremented based on the order of the cell on which the second cDAI is to be obtained.

Aspect 18: The method of any one of Aspects 13-17, wherein a total downlink assignment index (tDAI) is included in each DCI of the plurality of DCI, the tDAI being in accordance with a total quantity of the plurality of DCI to be obtained in a slot in which the DCI is to be transmitted.

Aspect 19: The method of Aspect 18, wherein the tDAI indicates a total quantity of the plurality of DCI to be obtained in the slot in which the DCI is to be obtained and one or more other slots prior to the slot on which the DCI is to be obtained.

Aspect 20: The method of Aspect 18, wherein the tDAI comprises at least three bits.

Aspect 21: The method of any one of Aspects 13-20, wherein: a first tDAI is included in each first DCI of the first subset of the plurality of DCI, the first tDAI being in accordance with a total quantity of the first subset of the plurality of DCI to be transmitted in a slot in which the first DCI is to be obtained; and a second tDAI is included in each second DCI of the second subset of the plurality of DCI, the second tDAI being in accordance with the total quantity of the second subset of the plurality of DCI to be transmitted in a slot in which the second DCI is to be obtained.

Aspect 22: The method of Aspect 21, wherein: the first tDAI indicates the total quantity of the first subset of the plurality of DCI to be obtained in the slot in which the first DCI is to be obtained and one or more other slots prior to the slot on which the first DCI is to be obtained; and the second tDAI indicates the total quantity of the second subset of the plurality of DCI to be obtained in the slot in which the second DCI is to be obtained and one or more other slots prior to the slot on which the second DCI is to be obtained.

Aspect 23: The method of any one of Aspects 13-22, wherein the cDAI comprises at least three bits.

Aspect 24: The method of any one of Aspects 13-23, wherein each of the second subset of plurality of DCI to be obtained on the data channel schedules another one of the data channels.

Aspect 25: An apparatus for wireless communications, comprising: means for determining a counter downlink assignment index (cDAI) to be included in each of a plurality of downlink control information (DCI) to be transmitted, each of a first subset of the plurality of DCI to be transmitted on a control channel, and each of a second subset of the plurality of DCI to be transmitted on a data channel, each of the first subset of the plurality of DCI scheduling one of the data channels, and wherein each of the control channels and the data channels is to be transmitted on a cell of a plurality of cells, the determination of the cDAIs being based on order of the cell, with respect to the plurality of cells, on which each of the cDAIs is to be transmitted; means for generating the control channels and data channels in accordance with the determination; and means for outputting the control channels and the data channels for transmission.

Aspect 26: The apparatus of Aspect 25, wherein the means for determining the cDAIs comprises means for incrementing each of one or more of the cDAIs based on the order of the cell.

Aspect 27: The apparatus of Aspect 26, wherein the means for incrementing each of the one or more of the cDAIs comprises means for incrementing the one or more of the cDAIs starting with cDAIs to be transmitted in the first subset, followed by cDAIs to be transmitted in the second subset.

Aspect 28: The apparatus of Aspect 26, wherein the means for incrementing each of the one or more of the cDAIs comprises means for incrementing the one or more of the cDAIs starting with cDAIs to be transmitted first in time.

Aspect 29: The apparatus of any one of Aspects 25-28, wherein: the means for determining the cDAI to be included in each of the plurality of DCI comprises means for determining a first cDAI to be included in each of the first subset of the plurality of DCI and a second cDAI to be included in each of the second subset of plurality of DCI; and the apparatus further comprises means for incrementing each of one or more of the first cDAIs based on the order of the cell on which the first cDAI is to be transmitted and means for incrementing each of one or more of the second cDAIs based on the order of the cell on which the second cDAI is to be transmitted.

Aspect 30: The apparatus of any one of Aspects 25-29, further comprising means for determining a total downlink assignment index (tDAI) to be included in each DCI of the plurality of DCI, the tDAI being determined based on a total quantity of the plurality of DCI to be transmitted in a slot in which the DCI is to be transmitted.

Aspect 31: The apparatus of Aspect 30, wherein the tDAI indicates a total quantity of the plurality of DCI to be transmitted in the slot in which the DCI is to be transmitted and one or more other slots prior to the slot on which the DCI is to be transmitted.

Aspect 32: The apparatus of Aspect 30, wherein the tDAI comprises at least three bits.

Aspect 33: The apparatus of any one of Aspects 25-32, further comprising means for determining: a first tDAI to be included in each first DCI of the first subset of the plurality of DCI, the first tDAI being determined based on a total quantity of the first subset of the plurality of DCI to be transmitted in a slot in which the first DCI is to be transmitted; and a second tDAI to be included in each second DCI of the second subset of the plurality of DCI, the second tDAI being determined based on the total quantity of the second subset of the plurality of DCI to be transmitted in a slot in which the second DCI is to be transmitted.

Aspect 34: The apparatus of Aspect 33, wherein: the first tDAI indicates the total quantity of the first subset of the plurality of DCI to be transmitted in the slot in which the first DCI is to be transmitted and one or more other slots prior to the slot on which the first DCI is to be transmitted; and the second tDAI indicates the total quantity of the second subset of the plurality of DCI to be transmitted in the slot in which the second DCI is to be transmitted and one or more other slots prior to the slot on which the second DCI is to be transmitted.

Aspect 35: The apparatus of any one of Aspects 25-34, wherein the cDAI comprises at least three bits.

Aspect 36: The apparatus of any one of Aspects 25-35, wherein each of the second subset of plurality of DCI to be transmitted on the data channel schedules another one of the data channels.

Aspect 37: An apparatus for wireless communications, comprising: means for obtaining a counter downlink assignment index (cDAI) to be included in each of a plurality of downlink control information (DCI), each of a first subset of the plurality of DCI to be received on a control channel, and each of a second subset of the plurality of DCI to be received on a data channel, each of the first subset of the plurality of DCI scheduling one of the data channels, and wherein each of the control channels and the data channels is to be transmitted on a cell of a plurality of cells, the cDAIs being in accordance with an order of the cell, with respect to the plurality of cells, on which each of the cDAIs is to be received; and means for processing the control channels and data channels in accordance with the cDAIs.

Aspect 38: The apparatus of Aspect 37, wherein each of one or more of the cDAIs is incremented based on the order of the cell.

Aspect 39: The apparatus of Aspect 38, wherein the one or more of the cDAIs are incremented starting with cDAIs to be obtained in the first subset, followed by cDAIs to be obtained in the second subset.

Aspect 40: The apparatus of Aspect 38, wherein the one or more of the cDAIs are incremented starting with cDAIs to be obtained first in time.

Aspect 41: The apparatus of any one of Aspects 37-40, wherein: a first cDAI is included in each of the first subset of the plurality of DCI and a second cDAI is included in each of the second subset of plurality of DCI; each of one or more of the first cDAIs is incremented based on the order of the cell on which the first cDAI is to be obtained; and each of one or more of the second cDAIs is incremented based on the order of the cell on which the second cDAI is to be obtained.

Aspect 42: The apparatus of any one of Aspects 37-41, wherein a total downlink assignment index (tDAI) is included in each DCI of the plurality of DCI, the tDAI being in accordance with a total quantity of the plurality of DCI to be obtained in a slot in which the DCI is to be transmitted.

Aspect 43: The apparatus of Aspect 42, wherein the tDAI indicates a total quantity of the plurality of DCI to be obtained in the slot in which the DCI is to be obtained and one or more other slots prior to the slot on which the DCI is to be obtained.

Aspect 44: The apparatus of Aspect 42, wherein the tDAI comprises at least three bits.

Aspect 45: The apparatus of any one of Aspects 37-44, wherein: a first tDAI is included in each first DCI of the first subset of the plurality of DCI, the first tDAI being in accordance with a total quantity of the first subset of the plurality of DCI to be transmitted in a slot in which the first DCI is to be obtained; and a second tDAI is included in each second DCI of the second subset of the plurality of DCI, the second tDAI being in accordance with the total quantity of the second subset of the plurality of DCI to be transmitted in a slot in which the second DCI is to be obtained.

Aspect 46: The apparatus of Aspect 45, wherein: the first tDAI indicates the total quantity of the first subset of the plurality of DCI to be obtained in the slot in which the first DCI is to be obtained and one or more other slots prior to the slot on which the first DCI is to be obtained; and the second tDAI indicates the total quantity of the second subset of the plurality of DCI to be obtained in the slot in which the second DCI is to be obtained and one or more other slots prior to the slot on which the second DCI is to be obtained.

Aspect 47: The apparatus of any one of Aspects 37-46, wherein the cDAI comprises at least three bits.

Aspect 48: The apparatus of any one of Aspects 37-47, wherein each of the second subset of plurality of DCI to be obtained on the data channel schedules another one of the data channels.

Aspect 49: An apparatus for wireless communications, comprising: a processing system configured to: determine a counter downlink assignment index (cDAI) to be included in each of a plurality of downlink control information (DCI) to be transmitted, each of a first subset of the plurality of DCI to be transmitted on a control channel, and each of a second subset of the plurality of DCI to be transmitted on a data channel, each of the first subset of the plurality of DCI scheduling one of the data channels, and wherein each of the control channels and the data channels is to be transmitted on a cell of a plurality of cells, the determination of the cDAIs being based on order of the cell, with respect to the plurality of cells, on which each of the cDAIs is to be transmitted and generate the control channels and data channels in accordance with the determination; and an interface configured to output the control channels and the data channels for transmission.

Aspect 50: The apparatus of Aspect 49, wherein the determination of the cDAIs comprises incrementing each of one or more of the cDAIs based on the order of the cell.

Aspect 51: The apparatus of Aspect 50, wherein the increment of each of the one or more of the cDAIs comprises incrementing the one or more of the cDAIs starting with cDAIs to be transmitted in the first subset, followed by cDAIs to be transmitted in the second subset.

Aspect 52: The apparatus of Aspect 50, wherein the increment of each of the one or more of the cDAIs comprises incrementing the one or more of the cDAIs starting with cDAIs to be transmitted first in time.

Aspect 53: The apparatus of any one of Aspects 49-52, wherein: the determination of the cDAI to be included in each of the plurality of DCI comprises determining a first cDAI to be included in each of the first subset of the plurality of DCI and a second cDAI to be included in each of the second subset of plurality of DCI; and the processing system is further configured to increment each of one or more of the first cDAIs based on the order of the cell on which the first cDAI is to be transmitted and increment each of one or more of the second cDAIs based on the order of the cell on which the second cDAI is to be transmitted.

Aspect 54: The apparatus of any one of Aspects 49-53, the processing system is further configured to determine a total downlink assignment index (tDAI) to be included in each DCI of the plurality of DCI, the tDAI being determined based on a total quantity of the plurality of DCI to be transmitted in a slot in which the DCI is to be transmitted.

Aspect 55: The apparatus of Aspect 54, wherein the tDAI indicates a total quantity of the plurality of DCI to be transmitted in the slot in which the DCI is to be transmitted and one or more other slots prior to the slot on which the DCI is to be transmitted.

Aspect 56: The apparatus of Aspect 54, wherein the tDAI comprises at least three bits.

Aspect 57: The apparatus of any one of Aspects 49-56, the processing system is further configured to determine: a first tDAI to be included in each first DCI of the first subset of the plurality of DCI, the first tDAI being determined based on a total quantity of the first subset of the plurality of DCI to be transmitted in a slot in which the first DCI is to be transmitted; and a second tDAI to be included in each second DCI of the second subset of the plurality of DCI, the second tDAI being determined based on the total quantity of the second subset of the plurality of DCI to be transmitted in a slot in which the second DCI is to be transmitted.

Aspect 58: The apparatus of Aspect 57, wherein: the first tDAI indicates the total quantity of the first subset of the plurality of DCI to be transmitted in the slot in which the first DCI is to be transmitted and one or more other slots prior to the slot on which the first DCI is to be transmitted; and the second tDAI indicates the total quantity of the second subset of the plurality of DCI to be transmitted in the slot in which the second DCI is to be transmitted and one or more other slots prior to the slot on which the second DCI is to be transmitted.

Aspect 59: The apparatus of any one of Aspects 49-58, wherein the cDAI comprises at least three bits.

Aspect 60: The apparatus of any one of Aspects 49-59, wherein each of the second subset of plurality of DCI to be transmitted on the data channel schedules another one of the data channels.

Aspect 61: An apparatus for wireless communications, comprising: an interface configured to obtain a counter downlink assignment index (cDAI) to be included in each of a plurality of downlink control information (DCI), each of a first subset of the plurality of DCI to be received on a control channel, and each of a second subset of the plurality of DCI to be received on a data channel, each of the first subset of the plurality of DCI scheduling one of the data channels, and wherein each of the control channels and the data channels is to be transmitted on a cell of a plurality of cells, the cDAIs being in accordance with an order of the cell, with respect to the plurality of cells, on which each of the cDAIs is to be received; and a processing system configured to process the control channels and data channels in accordance with the cDAIs.

Aspect 62: The apparatus of Aspect 61, wherein each of one or more of the cDAIs is incremented based on the order of the cell.

Aspect 63: The apparatus of Aspect 62, wherein the one or more of the cDAIs are incremented starting with cDAIs to be obtained in the first subset, followed by cDAIs to be obtained in the second subset.

Aspect 64: The apparatus of Aspect 62, wherein the one or more of the cDAIs are incremented starting with cDAIs to be obtained first in time.

Aspect 65. The apparatus of any one of Aspects 61-64, wherein: a first cDAI is included in each of the first subset of the plurality of DCI and a second cDAI is included in each of the second subset of plurality of DCI; each of one or more of the first cDAIs is incremented based on the order of the cell on which the first cDAI is to be obtained; and each of one or more of the second cDAIs is incremented based on the order of the cell on which the second cDAI is to be obtained.

Aspect 66: The apparatus of any one of Aspects 61-65, wherein a total downlink assignment index (tDAI) is included in each DCI of the plurality of DCI, the tDAI being in accordance with a total quantity of the plurality of DCI to be obtained in a slot in which the DCI is to be transmitted.

Aspect 67: The apparatus of Aspect 66, wherein the tDAI indicates a total quantity of the plurality of DCI to be obtained in the slot in which the DCI is to be obtained and one or more other slots prior to the slot on which the DCI is to be obtained.

Aspect 68: The apparatus of Aspect 66, wherein the tDAI comprises at least three bits.

Aspect 69: The apparatus of any one of Aspects 61-68, wherein: a first tDAI is included in each first DCI of the first subset of the plurality of DCI, the first tDAI being in accordance with a total quantity of the first subset of the plurality of DCI to be transmitted in a slot in which the first DCI is to be obtained; and a second tDAI is included in each second DCI of the second subset of the plurality of DCI, the second tDAI being in accordance with the total quantity of the second subset of the plurality of DCI to be transmitted in a slot in which the second DCI is to be obtained.

Aspect 70: The apparatus of Aspect 69, wherein: the first tDAI indicates the total quantity of the first subset of the plurality of DCI to be obtained in the slot in which the first DCI is to be obtained and one or more other slots prior to the slot on which the first DCI is to be obtained; and the second tDAI indicates the total quantity of the second subset of the plurality of DCI to be obtained in the slot in which the second DCI is to be obtained and one or more other slots prior to the slot on which the second DCI is to be obtained.

Aspect 71: The apparatus of any one of Aspects 61-70, wherein the cDAI comprises at least three bits.

Aspect 72: The apparatus of any one of Aspects 61-71, wherein each of the second subset of plurality of DCI to be obtained on the data channel schedules another one of the data channels.

Aspect 73: A base station, comprising: a processing system configured to determine a counter downlink assignment index (cDAI) to be included in each of a plurality of downlink control information (DCI) to be transmitted, each of a first subset of the plurality of DCI to be transmitted on a control channel, and each of a second subset of the plurality of DCI to be transmitted on a data channel, each of the first subset of the plurality of DCI scheduling one of the data channels, and wherein each of the control channels and the data channels is to be transmitted on a cell of a plurality of cells, the determination of the cDAIs being based on order of the cell, with respect to the plurality of cells, on which each of the cDAIs is to be transmitted and generate the control channels and data channels in accordance with the determination; and a transmitter configured to transmit the control channels and the data channels.

Aspect 74: A user equipment, comprising: a receiver configured to receive a counter downlink assignment index (cDAI) to be included in each of a plurality of downlink control information (DCI), each of a first subset of the plurality of DCI to be received on a control channel, and each of a second subset of the plurality of DCI to be received on a data channel, each of the first subset of the plurality of DCI scheduling one of the data channels, and wherein each of the control channels and the data channels is to be transmitted on a cell of a plurality of cells, the cDAIs being in accordance with an order of the cell, with respect to the plurality of cells, on which each of the cDAIs is to be received; and a processing system configured to process the control channels and data channels in accordance with the cDAIs.

Aspect 75: A computer-readable medium for wireless communications, comprising instructions executable to: determine a counter downlink assignment index (cDAI) to be included in each of a plurality of downlink control information (DCI) to be transmitted, each of a first subset of the plurality of DCI to be transmitted on a control channel, and each of a second subset of the plurality of DCI to be transmitted on a data channel, each of the first subset of the plurality of DCI scheduling one of the data channels, and wherein each of the control channels and the data channels is to be transmitted on a cell of a plurality of cells, the determination of the cDAIs being based on order of the cell, with respect to the plurality of cells, on which each of the cDAIs is to be transmitted; generate the control channels and data channels in accordance with the determination; and output the control channels and the data channels for transmission.

Aspect 76: A computer-readable medium for wireless communications, comprising instructions executable to: obtain a counter downlink assignment index (cDAI) to be included in each of a plurality of downlink control information (DCI), each of a first subset of the plurality of DCI to be received on a control channel, and each of a second subset of the plurality of DCI to be received on a data channel, each of the first subset of the plurality of DCI scheduling one of the data channels, and wherein each of the control channels and the data channels is to be transmitted on a cell of a plurality of cells, the cDAIs being in accordance with an order of the cell, with respect to the plurality of cells, on which each of the cDAIs is to be received; and process the control channels and data channels in accordance with the cDAIs.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5-6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications, comprising:
determining counter downlink assignment indexes (cDAIs) to be included in a plurality of downlink control information (DCI) to be transmitted, each DCI of a first subset of the plurality of DCI to be transmitted on a control channel of control channels, each DCI of a second subset of the plurality of DCI to be transmitted on a data channel of data channels, each DCI of the first subset of the plurality of DCI scheduling one of the data channels,
wherein each of the control channels and the data channels is to be transmitted on a cell of a plurality of cells, the determination of the cDAIs being based on an order of the cell, with respect to the plurality of cells, on which each of the cDAIs into be transmitted;
generating the control channels and the data channels in accordance with the determination; and
outputting the control channels and the data channels for transmission.

2. The method of claim 1, wherein determining the cDAIs comprises incrementing each cDAI of one or more of the cDAIs based on the order of the cell on which the cDAI is to be transmitted, wherein incrementing each of the one or more of the cDAIs comprises incrementing the one or more of the cDAIs starting with cDAIs to be transmitted in the first subset followed by cDAIs to be transmitted in the second subset, or starting with cDAIs to be transmitted first in time.

3. The method of claim 1, wherein:
determining the cDAIs to be included in the plurality of DCI comprises determining a first cDAI to be included in the first subset of the plurality of DCI and a second cDAI to be included in the second subset of the plurality of DCI; and
the method further comprises:
incrementing the first cDAIs based on the order of the cell on which the first cDAI is to be transmitted; and
incrementing the second cDAI based on the order of the cell on which the second cDAI is to be transmitted.

4. The method of claim 1, further comprising determining a total downlink assignment index (tDAI) to be included in each DCI of the plurality of DCI, the tDAI being determined based on a total quantity of the plurality of DCI to be transmitted in a slot, wherein the tDAI indicates a total quantity of the plurality of DCI to be transmitted in the slot and one or more other slots prior to the slot.

5. The method of claim 1, further comprising determining:
- a first tDAI to be included in each first DCI of the first subset of the plurality of DCI, the first tDAI being determined based on a total quantity of the first subset of the plurality of DCI to be transmitted in a slot in which the first DCI is to be transmitted; and
- a second tDAI to be included in each second DCI of the second subset of the plurality of DCI, the second tDAI being determined based on the total quantity of the second subset of the plurality of DCI to be transmitted in a slot in which the second DCI is to be transmitted, wherein:
  - the first tDAI indicates the total quantity of the first subset of the plurality of DCI to be transmitted in the slot in which the first DCI is to be transmitted and one or more other slots prior to the slot on which the first DCI is to be transmitted; and
  - the second tDAI indicates the total quantity of the second subset of the plurality of DCI to be transmitted in the slot in which the second DCI is to be transmitted and one or more other slots prior to the slot on which the second DCI is to be transmitted.

6. The method of claim 1, wherein each cDAI of the cDAIs comprises at least three bits.

7. The method of claim 1, wherein each DCI of the second subset of the plurality of DCI to be transmitted on the data channel schedules another one of the data channels.

8. A method for wireless communications, comprising:
- obtaining counter downlink assignment indexes (cDAIs) to be included in a plurality of downlink control information (DCI), each DCI of a first subset of the plurality of DCI to be received on a control channel of control channels, each DCI of a second subset of the plurality of DCI to be received on a data channel of data channels, each DCI of the first subset of the plurality of DCI scheduling one of the data channels,
- wherein each of the control channels and the data channels is to be communicated on a cell of a plurality of cells, the cDAIs being in accordance with an order of the cell, with respect to the plurality of cells, on which each of the cDAIs is to be received;
- processing the control channels and the data channels in accordance with the cDAIs.

9. The method of claim 8, wherein each cDAI of one or more of the cDAIs is incremented based on the order of the cell on which the cDAI is to be received, wherein the one or more of the cDAIs are incremented starting with cDAIs to be obtained in the first subset followed by cDAIs to be obtained in the second subset, or starting with cDAIs to be obtained first in time.

10. The method of claim 8, wherein:
- a first cDAI is included in the first subset of the plurality of DCI and a second cDAI is included in the second subset of the plurality of DCI;
- the first cDAI is incremented based on the order of the cell on which the first cDAI is to be obtained; and
- the second cDAI is incremented based on the order of the cell on which the second cDAI is to be obtained.

11. The method of claim 8, wherein a total downlink assignment index (tDAI) is included in each DCI of the plurality of DCI, the tDAI being in accordance with a total quantity of the plurality of DCI to be obtained in a slot, wherein the tDAI indicates a total quantity of the plurality of DCI to be obtained in the slot and one or more other slots prior to the slot.

12. The method of claim 8, wherein:
- a first tDAI is included in each first DCI of the first subset of the plurality of DCI, the first tDAI being in accordance with a total quantity of the first subset of the plurality of DCI to be transmitted in a slot in which the first DCI is to be obtained; and
- a second tDAI is included in each second DCI of the second subset of the plurality of DCI, the second tDAI being in accordance with the total quantity of the second subset of the plurality of DCI to be transmitted in a slot in which the second DCI is to be obtained, wherein:
  - the first tDAI indicates the total quantity of the first subset of the plurality of DCI to be obtained in the slot in which the first DCI is to be obtained and one or more other slots prior to the slot on which the first DCI is to be obtained; and
  - the second tDAI indicates the total quantity of the second subset of the plurality of DCI to be obtained in the slot in which the second DCI is to be obtained and one or more other slots prior to the slot on which the second DCI is to be obtained.

13. The method of claim 8, wherein each cDAI of the cDAIs comprises at least three bits.

14. The method of claim 8, wherein each DCI of the second subset of the plurality of DCI to be obtained on the data channel schedules another one of the data channels.

15. A base station, comprising:
- a processing system configured to:
  - determine counter downlink assignment indexes (cDAIs) to be included in a plurality of downlink control information (DCI) to be transmitted, each DCI of a first subset of the plurality of DCI to be transmitted on a control channel of control channels, each DCI of a second subset of the plurality of DCI to be transmitted on a data channel of data channels, each DCI of the first subset of the plurality of DCI scheduling one of the data channels,
  - wherein each of the control channels and the data channels is to be transmitted on a cell of a plurality of cells, the determination of the cDAIs being based on an order of the cell, with respect to the plurality of cells, on which each of the cDAIs is to be transmitted;
  - generate the control channels and the data channels in accordance with the determination; and
- a transmitter configured to transmit the control channels and the data channels.

16. The base station of claim 15, wherein to determine the cDAIs, the processing system is configured to increment each cDAI of one or more of the cDAIs based on the order of the cell on which the cDAI is to be transmitted, wherein to increment each of the one or more of the cDAIs, the processing system is configured to increment the one or more of the cDAIs starting with cDAIs to be transmitted in the first subset followed by cDAIs to be transmitted in the second subset, or starting with cDAIs to be transmitted first in time.

17. The base station of claim 15, wherein:
- to determine the cDAIs to be included in the plurality of DCI, the processing system is configured to determine a first cDAI to be included in the first subset of the plurality of DCI and a second cDAI to be included in the second subset of the plurality of DCI; and the processing system is configured to:
- increment the first cDAI based on the order of the cell on which the first cDAI is to be transmitted; and
- increment the second cDAI based on the order of the cell on which the second cDAI is to be transmitted.

18. The base station of claim 15, wherein the processing system is configured to determine a total downlink assignment index (tDAI) to be included in each DCI of the plurality of DCI, the tDAI to be determined based on a total quantity of the plurality of DCI to be transmitted in a slot, wherein the tDAI indicates a total quantity of the plurality of DCI to be transmitted in the slot and one or more other slots prior to the slot.

19. The base station of claim 15, wherein the processing system is configured to determine:
- a first tDAI to be included in each first DCI of the first subset of the plurality of DCI, the first tDAI to be determined based on a total quantity of the first subset of the plurality of DCI to be transmitted in a slot in which the first DCI is to be transmitted; and
- a second tDAI to be included in each second DCI of the second subset of the plurality of DCI, the second tDAI to be determined based on the total quantity of the second subset of the plurality of DCI to be transmitted in a slot in which the second DCI is to be transmitted, wherein:
  - the first tDAI indicates the total quantity of the first subset of the plurality of DCI to be transmitted in the slot in which the first DCI is to be transmitted and one or more other slots prior to the slot on which the first DCI is to be transmitted; and
  - the second tDAI indicates the total quantity of the second subset of the plurality of DCI to be transmitted in the slot in which the second DCI is to be transmitted and one or more other slots prior to the slot on which the second DCI is to be transmitted.

20. The base station of claim 15, wherein each cDAI of the cDAIs comprises at least three bits.

21. The base station of claim 15, wherein each DCI of the second subset of the plurality of DCI to be transmitted on the data channel schedules another one of the data channels.

22. A user equipment, comprising:
- a receiver configured to receive a-counter downlink assignment indexes (cDAIs) to be included in a plurality of downlink control information (DCI), each DCI of a first subset of the plurality of DCI to be received on a control channel of control channels, each DCI of a second subset of the plurality of DCI to be received on a data channel of a plurality of data channels, each DCI of the first subset of the plurality of DCI scheduling one of the data channels,
- wherein each of the control channels and the data channels is to be communicated on a cell of a plurality of cells, the cDAIs being in accordance with an order of the cell, with respect to the plurality of cells, on which each of the cDAIs is to be received; and
- a processing system configured to process the control channels and the data channels in accordance with the cDAIs.

23. The user equipment of claim 22, wherein each cDAI of one or more of the cDAIs is incremented based on the order of the cell on which the cDAI is to be received, wherein the one or more of the cDAIs are incremented starting with cDAIs to be obtained in the first subset followed by cDAIs to be obtained in the second subset, or starting with cDAIs to be obtained first in time.

24. The user equipment of claim 22, wherein:
- a first cDAI is included in the first subset of the plurality of DCI and a second cDAI is included in each of the second subset of the plurality of DCI;
- the first cDAI is incremented based on the order of the cell on which the first cDAI is to be obtained; and
- the second cDAI is incremented based on the order of the cell on which the second cDAI is to be obtained.

25. The user equipment of claim 22, wherein a total downlink assignment index (tDAI) is included in each DCI of the plurality of DCI, the tDAI being in accordance with a total quantity of the plurality of DCI to be obtained in a slot, wherein the tDAI indicates a total quantity of the plurality of DCI to be obtained in the slot and one or more other slots prior to the slot.

26. The user equipment of claim 22, wherein:
- a first tDAI is included in each first DCI of the first subset of the plurality of DCI, the first tDAI being in accordance with a total quantity of the first subset of the plurality of DCI to be transmitted in a slot in which the first DCI is to be obtained; and
- a second tDAI is included in each second DCI of the second subset of the plurality of DCI, the second tDAI being in accordance with the total quantity of the second subset of the plurality of DCI to be transmitted in a slot in which the second DCI is to be obtained, wherein:
  - the first tDAI indicates the total quantity of the first subset of the plurality of DCI to be obtained in the slot in which the first DCI is to be obtained and one or more other slots prior to the slot on which the first DCI is to be obtained; and
  - the second tDAI indicates the total quantity of the second subset of the plurality of DCI to be obtained in the slot in which the second DCI is to be obtained and one or more other slots prior to the slot on which the second DCI is to be obtained.

27. The user equipment of claim 22, wherein each cDAI of the cDAIs comprises at least three bits.

28. The user equipment of claim 22, wherein each DCI of the second subset of the plurality of DCI to be obtained on the data channel schedules another one of the data channels.

* * * * *